United States Patent [19]
Peters

[11] 3,952,235
[45] Apr. 20, 1976

[54] CONTROL SYSTEM FOR ELECTRODYNAMIC MECHANISM

[75] Inventor: Leslie B. Peters, Sylmar, Calif.
[73] Assignee: Tru-Eze Manufacturing Co., Inc., Burbank, Calif.
[22] Filed: June 10, 1974
[21] Appl. No.: 477,827

[52] U.S. Cl. .................................................. 318/48
[51] Int. Cl.$^2$ .......................................... H02P 7/68
[58] Field of Search .............. 318/7, 37, 48, 65, 86, 318/91, 102, 109, 129, 267, 282, 284, 286, 468

[56] References Cited
UNITED STATES PATENTS

| | | | |
|---|---|---|---|
| 1,931,107 | 10/1933 | Dowell et al. ...................... | 318/7 X |
| 2,941,132 | 6/1960 | Dell ..................................... | 318/7 |
| 3,168,094 | 2/1965 | Siltamaki ............................ | 128/75 |
| 3,530,268 | 9/1970 | Aubrey .......................... | 318/286 X |
| 3,553,546 | 1/1971 | Springer ............................ | 318/48 |
| 3,561,520 | 2/1971 | Gill .............................. | 318/267 X |
| 3,566,228 | 2/1971 | Tsergas ......................... | 318/284 X |
| 3,760,250 | 9/1973 | Pearsall et al. ................... | 318/282 |
| 3,812,408 | 5/1974 | Penn et al. ....................... | 318/282 |

Primary Examiner—Robert K. Schaefer
Assistant Examiner—W. E. Duncanson, Jr.
Attorney, Agent, or Firm—Donald D. Mon

[57] ABSTRACT

There is disclosed an electric system for controlling the direction of rotation of two counter rotating motors operated from a source of A.C. line voltage, the system comprising a selecting circuit operated by a rectifier connected to the source and containing two junctions, a first of which is at a D.C. voltage V when the second is at zero voltage and vice versa. A reset switch operated mechanically by rotation of the motors puts the voltage V alternately at the first junction and the second junction. When the voltage V is at the first junction it produces a pulse in a first control path which controls the first of the motors and when it is on the second junction it puts a pulse on the second path for operating the second motor. Each control path comprises a latch circuit operated by the pulse, a time delay circuit and a motor control circuit including a power switch operable at the end of the time period to torque the respective motor. The two motors are on a shaft having a windlass on which is wound a cable attached to a load so that when the first motor turns it tensions the cable, which tension is held for a period of time after which the second motor turns to relax the cable, the relaxation being held for a period of time. This cycling continues until the power is turned off.

17 Claims, 2 Drawing Figures

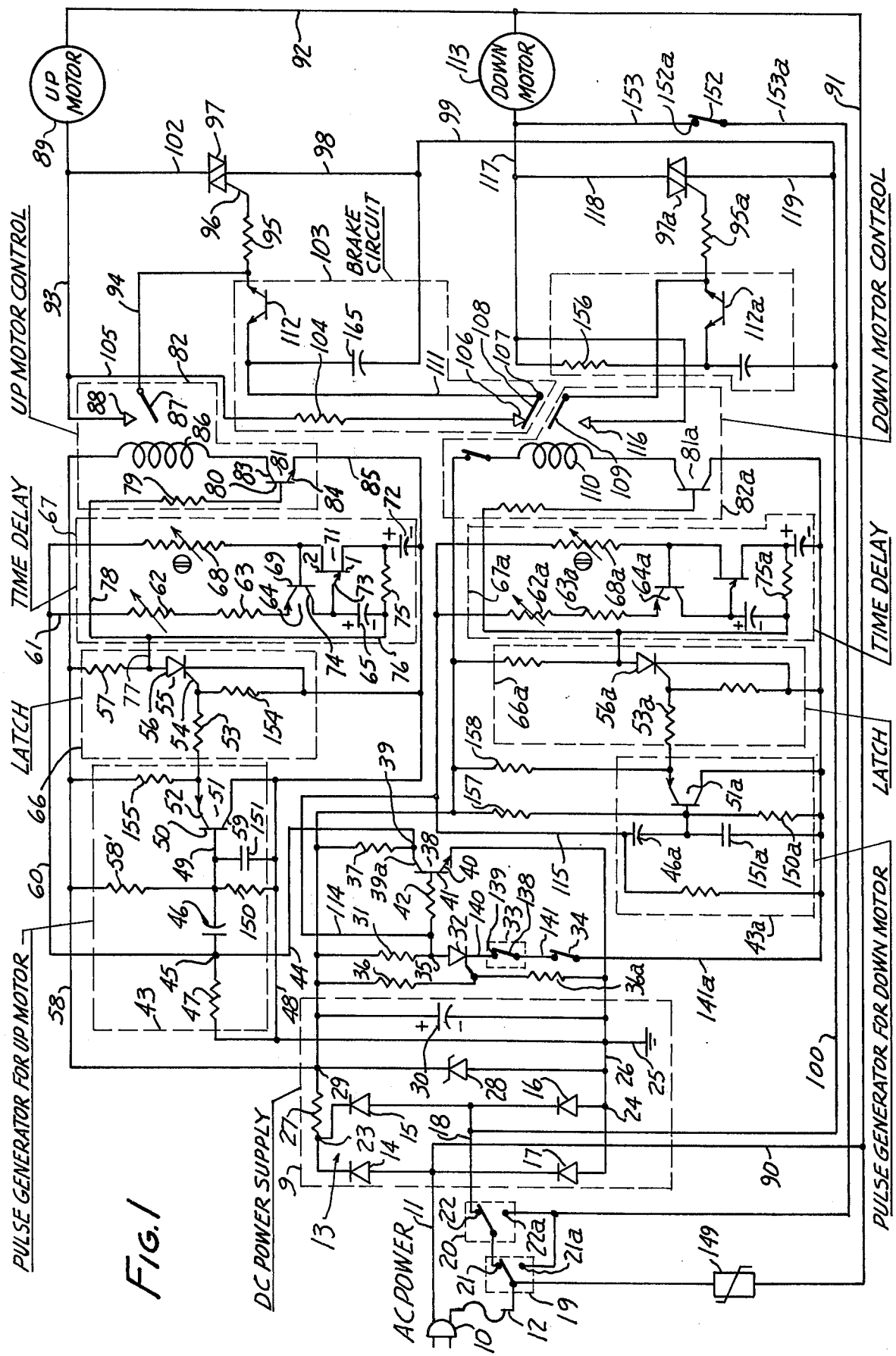

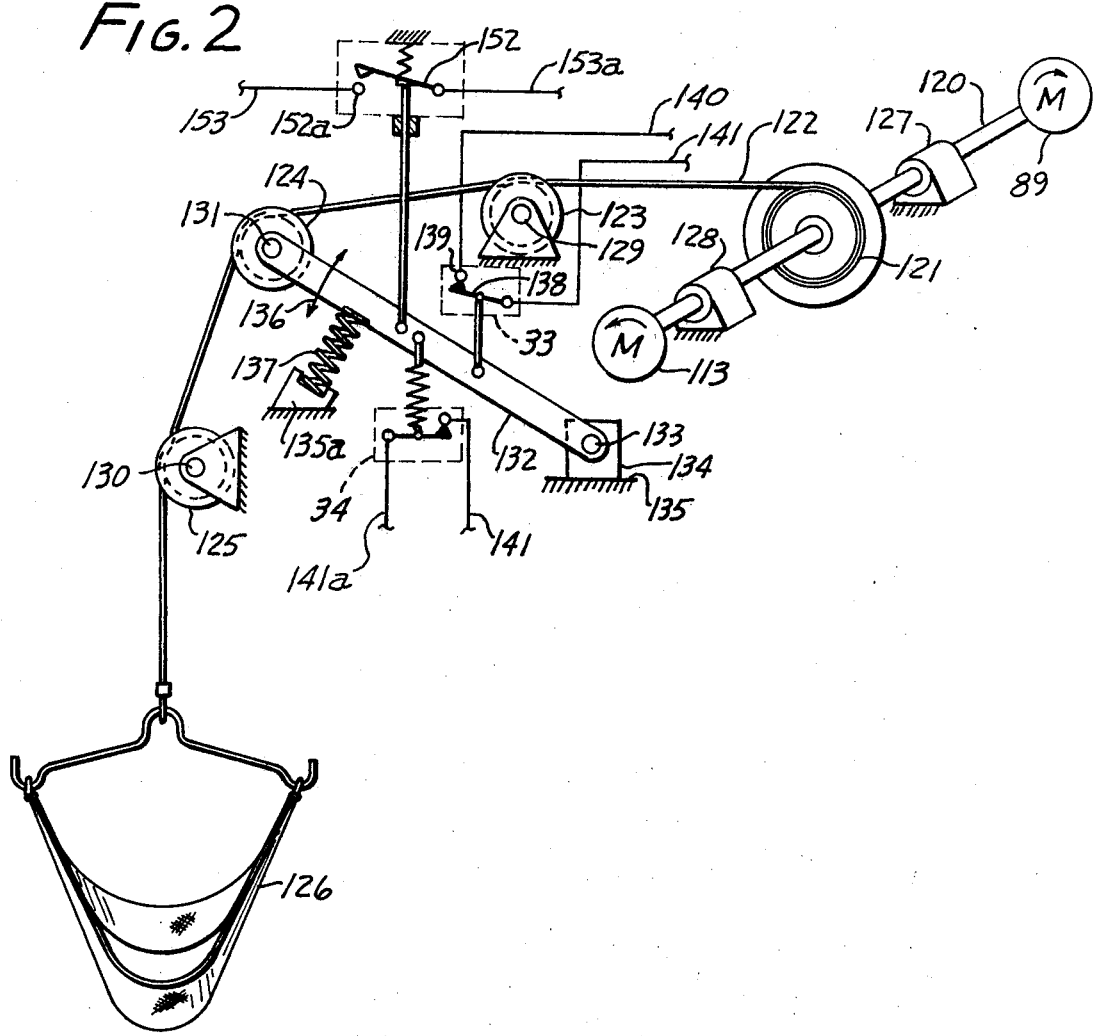

CONTROL SYSTEM FOR ELECTRODYNAMIC MECHANISM

This invention relates to control systems for electrodynamic equipment and more particularly to control systems for such equipment which exerts force for periods of time.

In Siltamaki U.S. Pat. No. 3,168,094 there is illustrated and described a traction therapy apparatus useful for therapy in which intermittent traction is used, such as for imparting traction to the spinal column of a patient. In that patent there is illustrated a reversible motor means mounted on a shaft having a windlass to which there is attached and wound a length of cable, the free end of which has attached to it a harness of a configuration especially adapted for fitting to the head of a patient so that when the cable is tensioned by action of the motor means turning in one direction a tension is exerted on the cable and the spinal column of the patient. A timing and control system permits the tension to be applied for a pre-established period of time after which the cable is relaxed by operation of the motor means in the opposite direction, this relaxation also lasting for a pre-established period of time. For the purpose of cycling the device alternately in its tension and relaxed conditions for periods of time there is provided an electrical control system including mechanical timers. The system of that patent is subject to a number of disadvantages. An important disadvantage is that it is not always precise in its operation. A related disadvantage is that it is adversely affected by variations of voltage and a drop of voltage can render the system inoperative. A drop of voltage also renders the tension and relaxation drives sluggish so that they only go through part of their intended cycle.

An object of the present invention is to provide a control system which avoids disadvantages of the system of the Siltamaki patent.

A related object is to provide a control system which is relatively fool-proof.

Another object is to provide an electrical control system capable of tolerating a wide variation in line voltage.

The invention is carried out by an electrical system for controlling a dynamo-electric mechanism such as an electric motor means subject to the production of movement or force in opposite directions in response to the control system. The dynamo-electric mechanism is powered from a source such as an ordinary line voltage commonly used in buildings, and the system for controlling it is operated by a D.C. voltage which may be derived by rectification from the line voltage where the line voltage is an ordinary alternating current source. The control system has a selecting circuit including two points or junctions one of which is at an established voltage V when the other is at an established lower voltage, ordinarily zero or ground potential, and vice versa, and means is provided for causing the voltage V to shift back and forth between these two points or junctions which may herein be referred to as control junctions. One of these control junctions connects with a path which performs a control operation on the dynamo-electric mechanism in one of its directions of movement or force and the second junction point functions to operate a control path which controls the dynamo-electric means in its opposite direction of movement or force.

A switch, herein referred to as a reset switch, operable from a mechanical means responsive to the forces or movements of the dynamo-electric mechanism, establishes the times at which the first junction is at voltage V while the second junction is at the lower or zero voltage and vice versa.

A pulse generating means is responsive to the voltage V at the first and second junctions. Thus, at the time that the reset switch causes the voltage V to appear at the first junction this voltage V causes a pulse to appear at the first path which results in the unlocking of a latch circuit which sets a timing circuit in operation. At the termination of the pre-established time period of this timing circuit, a switch is operated which has the effect of applying line voltage to the dynamo-electric mechanism in its first direction of force or motion. As soon as this full force or motion is reached, mechanical means connected with the dynamo-electric mechanism operates the reset switch to take the full line voltage off the part of the dynamo-electric means which produces the first direction of motion or force, whereupon a braking circuit comes into operation to produce somewhat less than full force in the first direction.

The time duration of this braking condition is established in the second path of the system which controls the opposite direction of force or motion of the dynamo-electric mechanism because when the condition of full force or motion was reached in the first direction the operation of the reset switch caused control voltage V to appear at the second junction to pulse the second path and set its timing system in operation. At the end of the timing period established in the second path the dynamo-electric machine is made operable in its second direction of motion or force and the braking feature applied to the first direction of motion force is discontinued.

In this manner the system will cycle until power is removed from it and this cycling will cause the dynamo-electric means to produce its force or motion in the first direction for a period of time followed by a force or motion in the second direction for another period of time, and so on.

The system is useful in connection with traction therapy equipment and for this purpose the dynamo-electric mechanisms may comprise a motor or motor winding which torques in the said first direction of motion or force and another motor or motor winding which torques in the opposite direction of motion or force. The machine producing the said first direction of motion or force may herein be referred to as an UP motor, as in a therapy apparatus it may operate a windlass containing a cable attached to a head strap device or the like, so that in the said first direction the cable is tensioned for an established period of time and while in the second direction the cable is relaxed for an established period of time.

The foregoing and other features of the invention will be better understood from the following detailed description and the accompanying drawings of which:

FIG. 1 shows a system according to this invention; and

FIG. 2 shows a mechanical arrangement comprising a cable attached to a head strap, operable by the dynamo-electric mechanism shown in FIG. 1 and serving to control switches including the said reset switch shown in FIG. 1.

Referring to the drawings, the system of FIG. 1 receives its electric power from an ordinary A.C. power source, for example a 117 volt, 60 cps source, through a plug 10 from which an electric line comprising conductors 11 and 12 lead to a D.C. power supply shown within rectangle 9, to supply the components of the system with D.C. power. The A.C. power is supplied to bridge rectifier 13 comprising diodes 14, 15, 16 and 17 over leads 11 and 18 when switches 19 and 20 are at their respective contacts 21 and 22. The switch 19 is intended to be manipulated by the operator of the machine, and the switch 20 is adapted to be manipulated by the patient under treatment. These switches are described in further detail later.

The rectified output of the bridge is taken at terminals 23 and 24, the latter of which is grounded at 25 through conductor 26. The ungrounded terminal 23 is connected through a resistor 27 to one side of a zener diode 28 the other side of which is grounded. Thus the zener diode is effectively across the D.C. output of the rectifier through this resistor, the value of which is selected as such that it would drop the rectified voltage at its junction 29 with the zener diode by a substantial amount, for example to 25 volts D.C. above ground. Actually however the zener breaks down immediately upon receiving the rectified voltage so that the D.C. voltage V across the zener diode at junction 29 becomes even less, for example 15 volts. This arrangement insures that there will always be a precise D.C. voltage V at point 29 relative to ground, regardless of substantial swings of A.C. supply voltage which can sometimes produce a considerable reduction of rectified voltage at junction 23. There is connected across the zener diode 28 a capacitor 30 which functions as a filter for the pulsating D.C. so that there is substantially pure D.C. at junction 29 without superimposed A.C. Unless otherwise stated all D.C. voltages noted herein are with reference to ground 25.

There is connected in series between junction 29 and ground a resistor 31, a silicon-controlled rectifier 32, a normally closed reset switch 33 and a normally closed safety switch 24. The voltage V at junction 29 established by the zener diode 28 is substantially entirely across resistor 31 since under this condition the SCR 32 is not blocking and its resistance is negligibly small. Hence, the voltage at junction 35 between resistor 31 and SCR 32 is zero. A high resistance resistor 36 is connected across the series-arranged resistor 31 and SCR 32. Resistors 36 and 36a together act as a current limiter to keep the current at the gate at SCR 32 at a certain level. There is also connected between junction point 29 and ground the series arrangement of a resistor 37 and a transistor 38, the junction 39 between the resistor and the transistor being at the collector 39a, the emitter 40 being grounded. The base 41 of the transistor is connected to junction 55 through a resistor 42.

As previously explained, when the patient switch 20 is first turned to its contact 22 (after the operator's switch 19 is turned to its contact 22) junction 35 goes to zero voltage. The reason for this is that when the patient switch 20 is first turned on there will be a voltage V at junction 29 and current will flow through resistors 36 and 36a thus putting enough voltage on the gate of the SCR 32 to drive it to the condition of conduction. When SCR 32 thus goes to conduction the voltage at junction 35 goes to zero, that is, ground potential, and this has the effect, through resistor 42, to take transistor 38 out of the condition of conduction, thereby putting its collector 39a and junction 39 at voltage V.

A pulse generator shown within rectangle 43 is connected to junction 39 by a conductor 44 which conveys it to a junction 45 between a capacitor 46 and a resistor 47. The opposite side of the resistor 47 connects with a conductor 48 which is referred to herein as the base conductor for the pulse generator; and the opposite side of capacitor 46 is connected by a conductor 49 to the base 50 of a transistor 51. When the patient switch is first turned on the application of the voltage V at junction 45 applies a pulse, which may be of the order of 60 milli-seconds, on conductor 49 by action of the integrating circuit comprising capacitor 46 and resistor 47, and this pulse is applied on transistor 51 where it appears at its emitter 52 and at a voltage-dividing network comprising resistors 53 and 154 and at the gate 54 of an SCR 55, within a latch circuit shown within rectangle 66. Although the pulse gets to transistor 51, the steady voltage V at junction 45 does not arrive at transistor 51 because it is blocked by capacitor 46. The pulse at gate 54 drives SCR 55 to conduction so that its anode 56 goes to zero voltage. The base 50 of transistor 51 likewise goes to zero voltage, and when the base 50 thus goes to zero voltage the transistor is saturated, putting its collector 52 at voltage V.

The voltage V at junction 45 is applied over conductors 60 and 61 to one side of a linear potentiometer 62 within a time delay circuit shown within rectangle 67. Potentiometer 62 is in series with a resistor 63, a transistor 64 and a capacitor 65, and when the voltage at anode 56 went to zero voltage by action of the pulse, the voltage V became established across these series-connected elements 62, 63, 64 and 65, thereby starting a timing cycle. Potentiometer 62, resistor 63 and capacitor 65 establish the time of this timing cycle which is the time required to charge capcitor 65 to a voltage determined by resistor elements 62 and 63. A trimming potentiometer 68 is connected between conductor 60 and the base 69 of transistor 64. The base 69 is connected to base 2 of a uni-junction 71 and base 1 of the uni-junction is connected to one side of a capacitor 72, the other side of which is connected to ground. The emitter 73 of the uni-junction connects with the collector 74 of transistor 64. A resistor 75 is connected between base 1 of the uni-junction 71 and the side of capacitor 65 remote from emitter 73.

When the voltage on the emitter 73 of the uni-junction becomes equal to that on its base 2, the uni-junction becomes conductive and has negligible resistance between the emitter and base 1, thus causing capacitor 65 to discharge at this time. Part of its discharge pulse passes through resistor 75 and the discharge capacitor 72 to ground, and part passes over conductors 76 and 77 to the anode 56 of the SCR 55 which is thus made non-conductive. This applies the voltage V of conductor 58 to anode 56 and also over conductors 77 and 78 and resistor 79 to the base 80 of a transistor 81.

Transistor 81 is part of a motor control shown within broken line enclosure 82. When transistor base 80 goes to voltage V its collector 83 goes to zero voltage because the transistor from the collector to emitter 84 is made conductive, with negligible resistance, and emitter 84 is grounded via conductors 85 and 48. This causes current to flow from conductor 58 through a relay coil 86 to ground, which closes normally open relay armature switch 87 against a contact 88 to close an A.C. power circuit through a dynamo-electric mechanism in the form of a motor 89 (herein referred to as an UP motor because it is shown in FIG. 2 pulling a cable up) starting it up at full force. This A.C. power circuit is over conductors 11, 90, 91, 92, 93, switch contacts 88 and 87, resistor 95, gate 96 of a triac rectifier 97, conductors 98, 99, 100, 18, closed switches 20 and 21 and conductor 12 back to plug 10. The triac 97, as a result of being thus activated by the voltage applied to gate 96, operates to transmit full wave, and the effect of this activation is to make its impedance negligibly low so that the A.C. current through motor 89 is completed through a conductor 102 between triac 97 and conductor 93 and through triac 97 and through conductors 98, 99 and 100 to complete the power circuit. This not only sends full AC power current through the motor so long as switch 87 is closed but also will keep some A.C. current through the motor 89 even after switch 87 opens as will presently be described.

The motor 89 when first turned on is subjected to a predetermined torque load, as for example occurs when it is required to wind up a cable, such as a cable 122 in FIG. 2 to a pre-determined full load tension, as will be explained in further detail hereinafter. The motor, after being turned on as described above, almost immediately arrives at its assigned full load as may be measured by the pounds of tension on such a cable, and this degree of tension is sufficient to open the reset switch 33, elements 33 and 122 both being illustrated in FIG. 2. When the reset switch 33 opens there is no path for current flow between ground and SCR 32, and this causes junction 35 to go to voltage V which drives transistor 38 to conduction so that junction 39 goes to zero voltage. The reason for this is that the normally open switch arm 87 in the UP motor control circuitry opens because there is no UP power (although a braking feature of the UP motor is operative as described below). For reasons to be explained in more detail hereafter with reference to FIG. 2, it is ordinarily desired in operating this motor, to hold it at its assigned full load condition for a period of time, herein referred to as a "holding dwell", after first arriving at the full load condition. Accordingly provision is made to reduce the A.C. current through the motor immediately upon reaching the full load condition, to a lower value below the value which had been required to bring it to its full load condition, but sufficient to keep enough torque on it to hold it from reversing direction, which would release the load if such reversal were permitted. For carrying out this purpose there is provided a brake circuit shown within the broken line enclosure 103, which is operated for the "holding dwell" period of time.

Referring to this brake circuit, as soon as the UP motor 89 gets to its assigned full load the load force operates a mechanism, described hereinafter in reference to FIG. 2, which causes the motor control switch 87 to open from its contact 88, at which moment the brake circuit immediately becomes operative. The brake circuit includes a resistor 104 (which may satisfactorily be 120,000 or 150,000 ohms) one side of which is connected by a conductor 105 to conductor 93 and the other side of which is connected to a contact 106 of a double pole, single throw, reed relay 107 one of whose reeds 108 normally is in contact with contact 106. The reed relay, which has a second reed 109 normally out of contact with any contact element, is operable by a relay coil 110. The brake circuit comprises resistor 104, reed element 108, a conductor 111, a silicon bi-lateral switch 112 (in which current flows through both electrodes related to its base), and resistor 95 to the gate 96 of triac 97. Resistor 104 allows sufficient voltage to be applied to the gate 96 to keep the triac 97 partially conductive so that enough current can continue to flow through the motor 89 through conductor 98 to keep enough torque on the motor to keep it stalled against reversing direction for a "holding dwell" period, due to the tension pull from the cable as will be described in connection with FIG. 2. Capacitor 165, which may conveniently be a .1 MF 250 volt DC capacitor, functions as a filter to filter out the AC superimposed on the DC which exists at the junction of this capacitor with the bilateral switch element 112, letting relatively pure direct current pass through this bilateral switch. Details of this action of the braking system produced by this arrangement of circuit components may be described as follows: The silicon bilateral switch has the inherent characteristic of a silicon switch component of requiring a minimum voltage above which it is conductive and below which it is not conductive, this minimum voltage being commonly referred to as its break-over voltage. Since this component is bilateral is triggers a current flow at the break-over voltage in each direction of current flow. Thus when the motor control switch 87 opens from its contact 88, the gate 96 of triac 97, which up to that time had been rendering the triac fully conductive, is now no longer receiving voltage through switch 87. Hence voltage through switch 87 now ceases to render the triac conductive. However, the open switch 87 is by-passed by conductor 105, resistor 104, reed switch arm 108, conductor 111 and bilateral switch 112 to resistor 95, so that some voltage, sufficient to keep the triac 97 partially conductive, is applied to gate 96. Voltage through resistor 104 is now applied to the side of capacitor 165 at conductor 111 thus charging up this capacitor. At the point of each positive half-cycle of the AC voltage which is at the break-over voltage of the bilateral switch 112, the bilateral switch becomes conductive so that the capacitor 165 discharges through the bilateral switch thereby applying some voltage on gate 96. Likewise when the break-over voltage is reached at each negarive half-cycle, current also flows. Resistor 104 and capacitor 165 comprise a typical time delay circuit and their effect is to drop the voltage at the junction of capacitor 165 and bilateral switch 112 to a desirable value which may be about 16 volts. Hence the triac 97 is rendered intermittently conductive through only parts of half cycles of the AC voltage. These periodic intervals of conduction allow sufficient current to flow through the motor 89 through conductor 102, triac 97 and conductor 98 to maintain the motor in the hold condition.

Having discussed silicon bilateral switch 112, the operation of silicon bilateral switch 112a is apparent. Thus when the reset switch 33 causes voltage V to appear at junction 35 (junction 39 at the same time being at zero voltage), the operation of the pulse generator, latch and time delay for the Down-motor causes relay 110 to open switch element 108 thereby removing voltage from the gate 96, and causing triac 97 to become non-conductive and therefore to remove all power from the UP-motor. The switch element 109 is moved simultaneously with switch element 108 to close its contact which causes the voltage at conductor 117 to be applied directly to the resistor 95a connected to the gate of triac 97a. This makes triac 97a fully conductive so that the Down-motor now runs. Immediately previous to this movement of the two switch elements 108 and 109 the closure of switch 108 against its contact 106 had been keeping triac 97 partially conductive for the described holding-dwell period. During all the time that switch element 108 was closed and switch element 109 was open, the triac 97a was being maintained partially conductive by reason of the fact that resistor 156 was allowing some current from conductor 117 to flow through it to the silicon bilateral switch 112a, thereby putting some voltage on the gate of triac 97a, sufficient to maintain this triac partially, but not fully, conductive. The capacitor connected to the junction of resistor 156 and bilateral switch 112a cooperates in this action by charging and discharging in the manner described above in connection with resistor 104 and capacitor 165. The effect of this is to maintain some drag from the Down-motor while the UP-motor is operating full force and on the holding-dwell, but resistor 156 being of greater resistance than that of resistor 104, the torque of the Down-motor during this period is less than that of the UP-motor.

When switch 33 opens, starting the "holding dwell" period, junction 35 goes to voltage V which causes a pulse at a pulse generator 43a in a control path for a motor 113 (herein referred to as a DOWN motor whose direction of rotation is opposite that of the UP motor, which lets down or relaxes the cable). Pulse generator 43a is analogous to that described for the UP motor pulse generator 43. It is noted that when junction 35 is at zero voltage, junction 39 is at voltage V and vice versa. Thus, when voltage V appears at junction 39 it produces the UP motor pulse and when voltage V appears at junction 35 it produces the DOWN motor pulse.

At the same time that full power to the UP motor is turned off by the opening of switch arm 87 the DOWN motor pulse is created which causes operation of the DOWN motor at the end of a time delay which occurs before the DOWN motor starts.

For this purpose there is provided for operating the DOWN motor, the pulse generator 43a, a latch 66a, a time delay 67a and a DOWN motor control 82a similar to, and corresponding with, the pulse generator 43, latch 66, time delay 67 and UP motor control 82, respectively, for the UP motor. As the elements and circuitry are the same for these corresponding control paths for the DOWN motor as for the UP motor, some of the elements or components in the DOWN motor control path are numbered the same as corresponding elements or components in the UP motor control path except that the letter *a* is added to the numbers in the DOWN motor path.

The voltage V for the DOWN motor pulse is transferred over conductors 114 and 115 to capacitor 46a which produces a pulse at pulse generator 43a in the same manner as a pulse for the UP motor was produced in pulse generator 43 by a voltage V over conductor 44. Latch 66a and time delay 67a operate similar to latch 66 and time delay 67 respectively, and relay coil 110 will be energized after expiration of this time delay period (herein referred to as a "rest dwell") to move reeds 108 and 109 so that reed 108 opens from contact 106 and reed 109 closes against contact 116 causing completion of the A.C. power circuit through DOWN motor 113 over conductors 91, 117 and 118, triac 97a, and conductors 119 and 100. The opening of reed 108 from contact 106 removes the braking current through the UP motor through the braking circuit.

At the end of the "rest dwell" time period, which is that of the delayed start of the DOWN motor, established by time delay 67a the reset switch 33 is closed again. This starts the cycle over again by sending junctions 39 and 45 to voltage V, thus producing the pulse at the pulse generator 43 as explained previously, and simultaneously removing power from the DOWN motor because the closing of reset switch 33 sends junction 35 to zero voltage simultaneously with junction 39 going to voltage V, and when junction 35 is at zero voltage current ceases to flow through relay coil 110 because reed 109 moves up off its contact 116 where it had been when the DOWN motor had been turned on.

The time period established for the time delay circuit 67a in the DOWN motor system establishes the time of the "holding dwell" following full torque at the UP motor, because the DOWN motor will not start up until the expiration of this time period. The DOWN motor is on the same shaft as the UP motor so that turning the power on the DOWN motor has the effect of reversing the direction of rotation of the shaft. Hence tension of the cable on the drum on the motor shaft from the torque of the UP motor will be relaxed when power is turned on the DOWN motor.

FIG. 2 shows a manner by which the system of FIG. 1 may be utilized. The mechanical elements in FIG. 2 are particularly adapted to be used with a traction therapy apparatus like that of U.S. Pat. No. 3,168,094, although it may find use with different types of apparatus. The motors 89 and 113 are assumed to be the UP and DOWN motors respectively designated by the same numbers as in FIG. 1 and these motors are fixed to the same rotatable shaft 120 on which there is fixed a windlass 121 having attached to it a cable 122 wound around the windlass for a number of turns and carried over pulleys 123, 124 and 125, the free end of which is tied to a head strap 126. Bearings 127 and 128 for shaft 120 are assembled to be mounted on the base or frame of an apparatus which may be somewhat like that of said U.S. Pat. No. 3,168,094 and likewise the shafts 129 and 130 of respective idler pulleys 123 and 125 are assumed to be journaled in a bearing mounted to the base. The third pulley 124 is rotatable on a shaft or pin 131 fixed to an arm 132 which is pivoted at 133 to a block 134 mounted on the base 135. By this arrangement the arm 132 has limited rotary motion in both directions as indicated by arrows 136. The arm is urged in a clockwise direction of rotation by a compression spring 137 compressed between the arm and a portion of the base 135. The force of this compression spring opposes the tension force on cable 122 due to the pull of the object to be attached to head strap 126 at the free end of the cable, which in this case is assumed to be the head of a patient undergoing therapy.

When the UP motor 89 turns in the clockwise direction upon being powered at the termination of the delay period of timer 67 (the rest dwell), the tension on the cable has the effect of turning the arm 132 counterclockwise against the force of the spring 137 and when a predetermined ultimate tension established by spring 137 is reached, switch contact 138 is moved away from contact 139. Contacts 138 and 139 are the contacts of reset switch 33 of FIG. 1 and conductors 140 and 141 are the same numbered conductors in FIG. 1.

When the tension is removed from the cable as when the DOWN motor is operated to torque the shaft 120 in the counter-clockwise direction at the end of the delay period of timer 67a (the holding dwell), the release of the tension on the cable permits the arm 132 to rotate in the clockwise direction so that the contacts of reset switch 33 close again and the relaxation responsive switch arm 152 closes against its contact 152a. Conductors 153 and 153a from these switch contacts correspond to the same numbered conductors in FIG. 1. Switch 34, corresponding to the same-numbered switch in FIG. 1 never opens unless switch 33 fails to open when it should and will be set to operate at about 2 pounds more compression of spring 137 and is required to open switch 33.

The circuit of FIG. 1 contains a number of desirable refinements among which are the following:

The operator's switch 19 is preferably provided with a timer which may be an ordinary mechanical timer, like a spring-wound alarm or kitchen clock, which at the end of a pre-set period of time after closing the switch onto its contact 21, will open the switch arm from that contact and connect it to the opposite contact 21a which will shut off the D.C. power supply 9 and turn on the A.C. power to the DOWN motor to relax the cable and prevent further cycling of the system. The patient himself may perform the same function at any time before the switch arm of switch 19 is turned to contact 21a, by turning the switch arm of the patient switch 20 from its contact 22 to its opposite contact 22a.

Another desirable feature would be to include a transient suppressor in 149 the line of conductor 91 from one side of the A.C. power line to one side of the motors. Such a transient suppressor could comprise two zener diodes back-to-back and it would have the effect of clipping off the peaks of the A.C. wave. This clipping action clips off noise spikes which if present might adversely affect the operation of the system.

Another desirable feature is the provision of a resistor 150 and capacitor 151 between the base 50 of transistor 51 and conductor 48 which is for the purpose of cancelling small induced or air borne extraneous pulses which if present could produce undesired false pulses in the pulse generator 58 for operating the UP motor. A similar resistor 150a and capacitor 151a serves a similar purpose at the pulse generator 43a for operating the DOWN motor. Larger pulses across capacitors 46 and 46a generated during the normal operation of the system are effective in spite of the presence of resistor 150 and capacitor 151 and the resistor 150a and capacitor 151a.

Switch 34 is a safety switch kept normally closed. As noted above it only opens under the circumstance that switch 33 fails to open when it should, and it is set to open at about 2 pounds higher cable tension than the tension required to open switch 33. It is noted that when the patient wants to stop the operation of the system he pushes the switch arm of switch 20 downward to contact with contact point 22a, which turns the A.C. power on the DOWN motor until it relaxes the cable to such an extent that the safety switch opens.

A normally closed switch 152 is placed in a conductor line 153 from one side of the DOWN motor to contacts 21a and 22a of respective switches 19 and 20. This is for the purpose of a cable release (as previously explained).

A number of the features in the circuitry of FIG. 1 are note-worthy: resistor 58, which may conveniently be about 3.3 megohms provides a base bias for transistor 51, putting that transistor at cut-off. The transistor is driven to conduction when voltage V appears at junction 45.

Resistor 154, which may conveniently be about 15,000 ohms is part of a voltage divider comprising resistors 53 and 154. It serves to limit the current into the gate of SCR 55 to protect it.

Resistor 155, which may conveniently be about 2.2 megohms acts as a load resistor for emitter 52.

Potentiometer 68, which may conveniently be about 2.2 K is a trimming potentiometer which trims up the time delay through the delay circuit composed of elements 68, 62, 63, 65, and 71.

Resistor 104, which may conveniently be about a 120 K resistor, is a current limiting resistor which has the effect of dropping the voltage appearing at the junction of capacitor 165 and bi-lateral switch 112 to a desirable value which may be about 16 volts. This lower voltage will permit enough current to pass through the bi-lateral switch 112 to supply enough D.C. to fire the triac 97 sufficiently to let just enough A.C. go through the triac to produce the braking function at the UP motor.

Corresponding elements in the down circuit system are for an analogous purpose.

A considerable choice of values of individual circuit components is available. The following sets of values have been found satisfactory for the purpose explained:

| Component | Value | Unit |
|---|---|---|
| Capacitor 30 | 100 | mf |
| Resistor 31 | 1,000 | ohms |
| Resistor 42 | 330,000 | ohms |
| Resistor 37 | 4,700 | ohms |
| Resistor 47 | 330,000 | ohms |
| Capacitor 46 | .001 | mf |
| Resistor 58 | 3.3 | megohms |
| Capacitor 151 | 100 | mmf |
| Resistor 53 | 33,000 | ohms |
| Resistor 154 | 15,000 | ohms |
| Resistor 155 | 2.2 | megohms |
| Resistor 57 | 120,000 | ohms |
| Resistor 63 | 6,800 | ohms |
| Potentiometer 62 | 150,000 | ohms |
| Trimming Potentiometer 68 | 2,200 | ohms |
| Resistor 79 | 120,000 | ohms |
| Resistor 104 | 150,000 | ohms |
| Resistor 95 | 100 | ohms |
| Resistor 156 | 180,000 | ohms |
| Resistor 157 | 3.3 | megohms |
| Resistor 158 | 2.2 | megohms |

Similar values can be applied to the similar components related to the DOWN motor.

From the foregoing description it will be understood that to operate the mechanism the arm of switch 19 will be moved to contact 21, ordinarily by the operator of the machine who will ordinarily leave the closing of switch 20 onto contact 22 to the patient which will have the effect of starting the cycling by initiating the time period of the time delay circuit 67 which will ordinarily be set either by the operator or the patient by adjustment of potentiometer 62 prior to starting the machine. This delay period may be in the order of a few seconds such as about 5 to 12 seconds or the like, after which the UP motor will be torqued to full force to put the full established tension on the cable for producing the traction on the patient.

In practice the traction force will be adjustable, for example by adjusting the compression of spring 137 in FIG. 2. Immediately upon arriving at full tension the full power through the UP motor will be turned off but a lesser torquing current will continue through the braking circuit to hold this tension during the "holding dwell" established by the timing of time delay circuit 67a at the DOWN motor path, which is initiated at the same time that the full power is turned off the UP motor. This holding dwell period will be adjustable by adjustment of the potentiometer 62a and will ordinarily be a few seconds such as 5 to 12 seconds somewhat like that of the rest dwell period. At the expiration of the holding dwell the current will be turned off the brake circuit of the UP motor and the DOWN motor will start up in the direction reversed to that which torqued the UP motor so that the cable will relaxed, and this relaxation will operate the reset switch 33 to produce the pulse at the UP motor control path, starting the cycle all over again. This cycling will continue until it is shut-off which may be done at switch 19 or switch 20.

Although the dynamo-electric mechanism has been illustrated and described as a pair of motors it should be understood other dynamo-electric mechanisms may be used instead, for example two motor windings on a single electric machine, or solenoid operated armatures.

It will be understood that the embodiments of the invention illustrated and described herein are given by way of illustration and not of limitation, and that modifications or equivalents or alternatives within the scope of the invention may suggest themselves to those skilled in the art.

I claim:

1. A system for establishing the times and durations of the application of electric power from a power source to a pair of counter-operating dynamo-electric mechanisms capable of creating force, comprising:
    a. a source of D.C. voltage;
    b. a selecting circuit connected to said source containing two junctions a first of which is at a D.C. voltage V when the second is at a lower voltage than voltage V, and vice versa;
    c. a reset switch in said selecting circuit operable in a first position to put the voltage V at said first junction, and in a second position to put the voltage V at said second junction;
    d. a first control path for a first of said dynamo-electric mechanisms, and a second control path for the second of said dynamo-electric mechanisms, each of said control paths including:
        i. a pulse generator;
        ii. a latch circuit connected to a pulse outlet of said pulse generator and operated in response to the pulse;
        iii. a time delay circuit connected with said latch circuit which becomes closed upon operation of the latch so that it builds up a predetermined voltage at the expiration of a predetermined time period;
        iv. a control circuit including variable conductance means the degree of conductance of which is controllable by the application to it of a conductance controlling voltage, connected in circuit with said power source and the respective dynamo-electric mechanism for turning full power from the power source on and off the respective dynamo-electric mechanism;
        v. and control switch means operable by said predetermined voltage for establishing the degree of conductance of said variable conductance means;
    e. and means responsive, after a period of time to the amount of force of said dynamo-electric mechanisms to move the reset switch back and forth intermittently from one of its said positions to the other;
    whereby the application of voltage V at said first junction, while the reset switch is in its first position, creates at the first control path, a pulse which energizes the latch circuit to start the predetermined time period, at the expiration of which said predetermined voltage causes a sufficient degree of conductance of the variable conductance means to create force at the first dynamo-electric mechanism, which then causes the reset switch to move to its second position, removing the full power from the first mechanism and putting the voltage V on said second junction, thereby producing a pulse in the second control path, resulting in the application of power from the power source on the second mechanism at the expiration of the predetermined time period of the corresponding time delay circuit, and the reset switch continues to move intermittently back and forth from one of said positions to the other.

2. A system according to claim 1 in which said D.C. voltage V is maintained constant by means of a zener diode connected across said voltage V.

3. A system according to claim 2 in which the zener diode is connected across a rectifier which supplies said D.C. voltage and would supply a higher D.C. voltage than voltage V if the zener diode were not present.

4. A system according to claim 1 in which the selecting circuit comprises a silicon controlled rectifier having an anode and cathode in series with the reset switch, and a transistor having a collector, emitter and base, said base being connected to said anode through a resistor, said emitter being at said first junction and said anode being at said second junction.

5. A system according to claim 1 in which the pulse generator for the respective control paths comprises a resistance-capacitance circuit connected with the corresponding one of said junctions and an amplifying means in which the pulse is amplified.

6. A system according to claim 5 in which the latch circuit comprises a silicon-controlled rectifier having a cathode connected with the output of said amplifying means.

7. A system according to claim 6 in which the time delay circuit in each control path comprises a resistor and a capacitor and is closed through the silicon-controlled rectifier in the latch circuit.

8. A system according to claim 7 in which the control circuit in each path comprises a relay having a coil and an armature switch, the coil being in series with a transistor across voltage V, the base of the last-mentioned transistor being connected with the time delay circuit to make the transistor conductive at the expiration of the corresponding time period, said armature switch being in the power supply circuit for the respective dynamo-electric mechanism and closing the last-mentioned circuit when the relay coil is energized.

9. A system according to claim 1 in which the two mechanisms comprise counter-rotative motors.

10. A system according to claim 1 in which a cable is connected with said mechanisms so that the cable tensions when the first mechanism is energized and relaxes when the second mechanism is energized.

11. A system according to claim 10 in which a brake circuit by-passes said control switch, means said brake circuit comprising a resistor, a capacitor chargeable by the resistor and a bilateral switch, the resistor permitting passage of enough current to render the variable conductance means sufficiently conductive to hold the cable in tension until the reset switch operates to establish the power circuit through the second mechanism.

12. In a control system for establishing the times and durations of the application of electric power from a power source to counter-operating dynamo-electric mechanisms:
 a. a selecting circuit for connection to a source of D.C. voltage, said selecting circuit containing two junctions, a first of which is at a D.C. voltage V when the second is at a lower voltage than voltage V, and vice versa;
 b. a reset switch in said selecting circuit operable in a first position to put the voltage V at said first junction, and in a second position to put the voltage V at said second junction;
 c. means responsive to voltage V at each junction to create a pulse;
 d. latch means operated by said pulse;
 e. timer means activated by operation of said latch means;
 f. power swtich means operated upon the expiration of a predetermined period of time following the activation of said timer means, said power switch means applying power to said mechanisms to produce changes of force;
 g. a mechanical load subjected to said changes of force; and
 h. means operable in response to said changes of force on said load when the voltage V is at the first of the junctions, to reset the reset switch to put the voltage V on the second of the junctions.

13. The method of controlling the force exerted on a load by counter-force dynamo-electric mechanisms, which comprises:
 a. developing a voltage D.C. V for a first predetermined time period at a first junction while a lesser voltage exists at a second junction;
 b. developing a voltage D.C. V at the expiration of said first time period at said second junction for a second predetermined time period while the voltage at said first junction is at a lesser voltage;
 c. developing a first pulse when the voltage V appears at said first junction;
 d. developing a second pulse when the voltage V appears at said second junction;
 e. producing said predetermined time periods in response to each pulse;
 f. closing power circuits through said dynamo-electric mechanisms at the expiration of said time periods; and
 g. shifting the voltage V from one of said junctions to the other in response to force produced at said mechanisms.

14. A system according to claim 1 in which the variable conductance means comprises a triac.

15. A system according to claim 11 in which the variable conductance means comprises a triac.

16. A system according to claim 11 in which the brake circuit includes a first switch element which is closed when the voltage V is at the first junction and which is opened by the voltage V appearing at the second junction, thereby rendering the variable conductance means non-conductive and removing power from the first dynamo-electric mechanism.

17. A system according to claim 16 in which a second switch element closes when the first switch element opens and thereby renders conductive the variable conducance means in the power circuit of the second dynamo-electric mechanism.

* * * * *